United States Patent Office 2,875,202
Patented Feb. 24, 1959

2,875,202

PREPARATION OF THIOAMIDES

Frank A. V. Sullivan, Glenbrook, Conn., and Sonya A. J. Westerback, Holden, Mass., assignors to American Cyanamid Company, New York, N. Y., a corporation of Maine No Drawing. Application November 2, 1955
Serial No. 544,599

8 Claims. (Cl. 260—247.1)

This invention relates to thioamides. More particularly, it relates to thiofuramides. Still more particularly, it relates to a process of preparing thiofuramides having the formula

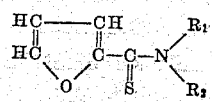

in which $R_1$ is hydrogen, an alkyl or aryl radical which may be substituted; $R_2$ is an alkyl or aryl radical which may be substituted; and in which $R_1$ and $R_2$ together form with the nitrogen a heterocyclic radical such as morpholyl, pyrrolidyl and piperidyl.

Thiofuramides are useful in various fields. They have been found particularly useful, however, as rubber chemicals, particularly as vulcanization accelerators. Many accelerators which are successfully employed with natural rubber fail for one reason or another to have the same accelerating action when employed with certain other synthetic elastomers. This is especially true in the case of the polymerization and copolymerization products of 2-chloro-1,3-butadiene. It is in the field of vulcanizing synthetic elastomers, especially those of the class defined, wherein the thiofuramides of this invention have been found to be of outstanding usefulness as accelerators.

Various procedures have heretofore been employed for preparing thiofuramides. They have been prepared, for instance, by reacting dithiofuroyldisulfide with an amine in an organic solvent. It has also been proposed to react an N-haloamine with an alkaline metal salt of dithiofuroic acid in an aqueous medium. In general, however, the prior art procedures suffer in that they require elevated operating temperatures, the use of reflux, and the like. In any commercial operation, therefore, these procedures involve complex equipment requirements as well as close supervisory control.

In accordance with this invention, a surprisingly simple yet effective method has been found for preparing the above class of thiofuramides. This method involves bringing together ammonium dithiofuroate with the selected amine in an aqueous medium. The reaction mixture is then permitted to stand until the thiofuramide is formed. The product is then separated by any of various conventional procedures which may be dictated by the particular form of the product.

The result obtained by the method of this invention is particularly surprising in view of the known procedure for preparing amine salts of dithiofuroic acid. This known procedure involves the reaction of ammonium dithiofuroate with an amine in water with resultant immediate formation of the amine salt. What is wholly unexpected in the method of this invention is that on prolonged standing of the reaction mass of the known procedure, formation of the thioamide occurs.

As indicated above, the amine which may be employed in the reaction may be widely varied. Representative of such amines are the mono- and di-methyl, ethyl, propyl, butyl, amyl and octyl amines which may carry substituent groups such as hydroxyl, halo, nitro and the like; phenylamine and naphthylamine, which may be similarly substituted; and heterocyclic amines such as morpholine, pyrrolidine and piperidine.

The amount of amine should be chemically equivalent to the ammonium dithiofuroate employed. When brought together in water and the reaction mixture permitted to stand, preferably with agitation, the product thiofuramide is obtained in high yield. Usually, the time of reaction is some 15–20 hours. It is desirable, however, to employ a molar excess of amine under which conditions a high yield of product is obtained in a shorter period.

The method of this invention proceeds readily at room temperature. In addition, the method may be conducted in any type vessel which need be only equipped, if desired, with agitating means. Because of the absence of strict procedural control and in view of the simplicity of equipment, a minimum of supervision is required.

The process of this invention is further illustrated by the following examples. Unless otherwise noted, all parts are by weight.

EXAMPLE 1

*N-cyclotetramethylenethiofuramide*

To a solution comprising 30 parts of ammonium dithiofuroate in 300 cc. of water is added 21.3 parts of pyrrolidine at room temperature. The mixture is stirred for 30 minutes and allowed to stand overnight, resulting in the formation of a solid material. Recrystallization from 60% alcohol gave the product in the form of yellow needles, M. P. 67–68° C.

EXAMPLE 2

*N-oxydiethylenethiofuramide*

To a solution of 40.3 parts of ammonium dithiofuroate in 250 parts of $H_2O$ is added 21.8 parts of morpholine at 29–32° C. The mixture is stirred at 25–30° C. for 15 hours. At the end of this time the crystalline product is filtered from the reaction mixture, dried and weighed. The yield of product, M. P. 62–64° C., is 91%. A sample recrystallized from aqueous alcohol melts at 71–74° C.

EXAMPLE 3

*N-cyclopentamethylenethiofuramide*

To a solution of 22.1 parts of ammonium dithiofuroate in 150 parts of $H_2O$ is added 18.8 parts of piperidine at 25–30° C. After standing at 25–30° C. during 15 hours the reaction mixture is transferred to a separatory funnel. The liquid product is drawn off, washed with water, dried and distilled. The compound boiled at 106–110° C./1 mm.

EXAMPLE 4

*N-2-hydroxyethylthiofuramide*

To a solution of 24.2 parts of ammonium dithiofuroate in 300 parts of $H_2O$ is added 9.15 parts of ethanolamine at 23–25° C. and the mixture permitted to stand at 25–30° C. overnight. The reaction mixture is extracted with two 50 ml. portions of ether; the ethereal solution dried and solvent ether stripped from the solution. The product is a yellow crystalline solid, M. P. 82–84° C.

EXAMPLE 5

*N-methylthiofuramide*

To a solution of 24.2 parts of ammonium dithiofuroate in 300 parts of water is added 4.66 parts of monomethylamine in 19 parts of $H_2O$ at 20–25° C. The action mixture is stirred for 12 hours at 25–30° C. and the product then filtered from the mixture. It melts at 69.5–70.5° C.

EXAMPLE 6
N-isopropylthiofuramide

To a solution of 24.2 parts of ammonium dithiofuroate dissolved in 300 parts of water is added 11.3 parts of isopropanol amine at 25–30° C. and the mixture permitted to stand at that temperature for 15 hours. At the end of that time, the aqueous reaction mixture is extracted with three 50 ml. portions of ether, the ethereal solution dried and the solvent stripped from the solution. The crude product so obtained melts at 61–65° C. and on recrystallization from aqueous alcohol melts at 71.5–72.5° C.

We claim:
1. A method of preparing a thiofuramide of the formula

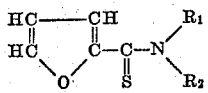

in which $R_1$ is selected from the group consisting of H, alkyl, hydroxyalkyl, phenyl and naphthyl; $R_2$ is selected from the group consisting of alkyl hydroxyalkyl, phenyl and naphthyl; and in which $R_1$ and $R_2$ when taken together with the nitrogen form a radical selected from the group consisting of morpholyl, pyrrolidyl and piperidyl; which comprises, bringing together ammonium dithiofuroate and at least about a chemical equivalent of an amine in an aqueous medium, permitting the reaction mixture to stand until the thiofuramide is formed, and recoverying the thiofuramide.

2. A method according to claim 1 in which the amine is morpholine.
3. A method according to claim 1 in which the amine is pyrrolidine.
4. A method according to claim 1 in which the amine is piperidine.
5. A method according to claim 1 in which the amine is methylamine.
6. A method according to claim 1 in which the amine is ethanolamine.
7. A method according to claim 1 in which the amine is employed in molar excess.
8. A method according to claim 1 in which the reaction temperature is room temperature.

References Cited in the file of this patent
UNITED STATES PATENTS
2,448,714    Hardman _____ Sept. 7, 1948

OTHER REFERENCES

Karrer: Organic Chemistry, 2nd ed., page 210 (1946).
Sidgwick: Organic Chemistry of Nitrogen, page 136 (1937).